United States Patent [19]

Ohkawa

[11] Patent Number: 4,543,231

[45] Date of Patent: Sep. 24, 1985

[54] MULTIPLE PINCH METHOD AND APPARATUS FOR PRODUCING AVERAGE MAGNETIC WELL IN PLASMA CONFINEMENT

[75] Inventor: Tihiro Ohkawa, La Jolla, Calif.

[73] Assignee: GA Technologies Inc., San Diego, Calif.

[21] Appl. No.: 330,361

[22] Filed: Dec. 14, 1981

[51] Int. Cl.[4] .............................................. G21B 1/00
[52] U.S. Cl. .................................. 376/133; 376/121; 376/142
[58] Field of Search ................ 376/121, 133, 137, 142

[56] References Cited

U.S. PATENT DOCUMENTS

| | | | |
|---|---|---|---|
| 3,677,890 | 7/1972 | Hartman | 376/137 |
| 4,065,350 | 12/1977 | Sheffield | 376/137 |
| 4,264,413 | 4/1981 | Ohkawa | 376/133 |
| 4,274,919 | 6/1981 | Jensen et al. | 376/133 |
| 4,330,864 | 5/1982 | Ohyabu | 376/133 |

OTHER PUBLICATIONS

R. K. Fisher et al., "Studies of Doublet Plasmas in Doublet IIA," Phys. Rev. Letters, vol. 39, No. 10, pp. 622-625, Sep. 5, 1977.
T. Ohkawa, "Multipole Configurations with Plasma Current", General Atomic Report GA-8528, Feb. 15, 1968.
Project Staff, General Atomic Company, "Doublet III Construction and Engineering Test", and Doublet III Experiment, Magnetic Fusion Energy Program Summary Progress Report, Fusion Division, Oct. 1, 1977-Sep. 30, 1978, General Atomic Report, GA-A15232, pp. 2-1 to 3-119, Apr. 1979.
M. Azumi, et al., "Plasma Confinement in Toroidal Ringless Quadrupole", Physics Letters, vol. 42A, No. 1, Nov. 6, 1972, pp. 81-82.
T. E. James, et al., "Some Design Aspects of a Large Reverse Field Pinch Experiment", Proceedings of the Sixth Symposium on Engineering Problems of Fusion Research, San Diego, Nov. 18-21, 1975, IEEE, Publication No. 75CH1097-5-NPS, pp. 383-386.
J. L. Johnson and J. M. Greene, "Resistive Interchanges and the Negative V Criterion", Plasma Physics, vol. 9, pp. 611-629, Pergamon Press 1967.
H. P. Furth, "Minimum-Average-B Stabilization for Toruses", Advances in Plasma Physics, Simon and Thompson, eds., vol. 1, pp. 67-100, Interscience Publishers 1968.
J. B. Taylor, "Relaxation of Toroidal Plasma and Generation of Reverse Magnetic Fields", Physical Review Letters, vol. 33, No. 19, pp. 1139-1141, Nov. 4, 1974.
H. A. B. Bodin and A. A. Newton, "Reversed-Field-Pinch Research," Nuclear Fusion, vol. 20, No. 10, pp. 1255-1323, 1980.

*Primary Examiner*—Sal Cangialosi
*Attorney, Agent, or Firm*—Fitch, Even, Tabin & Flannery

[57] ABSTRACT

A multipole plasma pinch method and apparatus produces hot magnetically confined z-pinch plasma with a plurality of z-pinch current channels arranged so as to generate a multipolar magnetic field and at least one hyperbolic magnetic axis within the plasma space roughly enclosed by the channels, forming thereby a region of average magnetic well in a region of nested closed plasma magnetic surfaces surrounding the plasma current channels, when the magnetic field component in the direction of the hyperbolic axis is also made to be substantially zero in the vicinity of the hyperbolic axis. The multipole pinch invention may be operated so that q and field reversal take place within the plasma, and the plasma so produced closely approximates known theoretical stability conditions. The well-producing hyperbolic axis of the present invention is produced effectively by replacing the solid conducting rings of prior art multipole plasma confinement devices by z-pinch-like toroidal current channel loops of plasma. The plasma is formed inside a vacuum chamber and an electrically conducting shaping shell assembly, whose noncircular poloidal cross section imparts the desired shape to the plasma. The shape of the plasma may be maintained and/or adjusted by means of electrical currents driven through appropriately distributed external conductors.

29 Claims, 9 Drawing Figures

QUADRUPOLES

HEXAPOLES

FIG. 5A
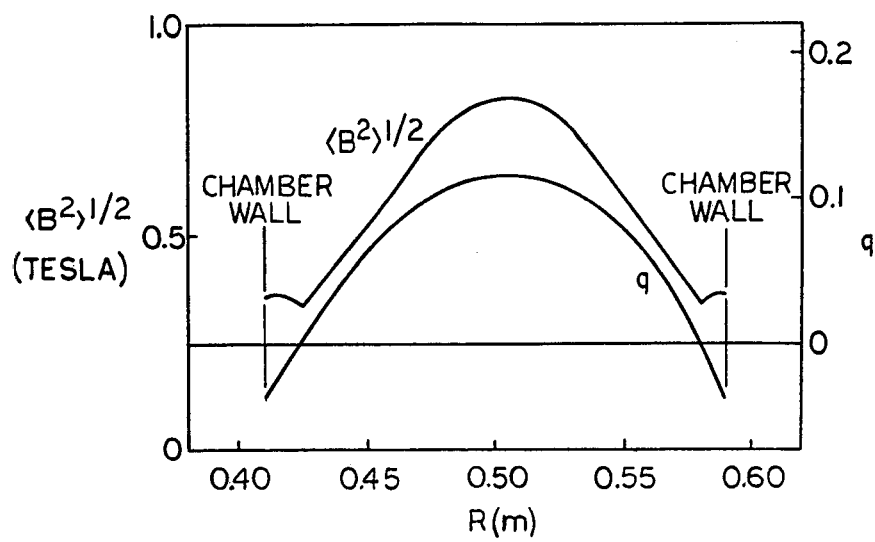
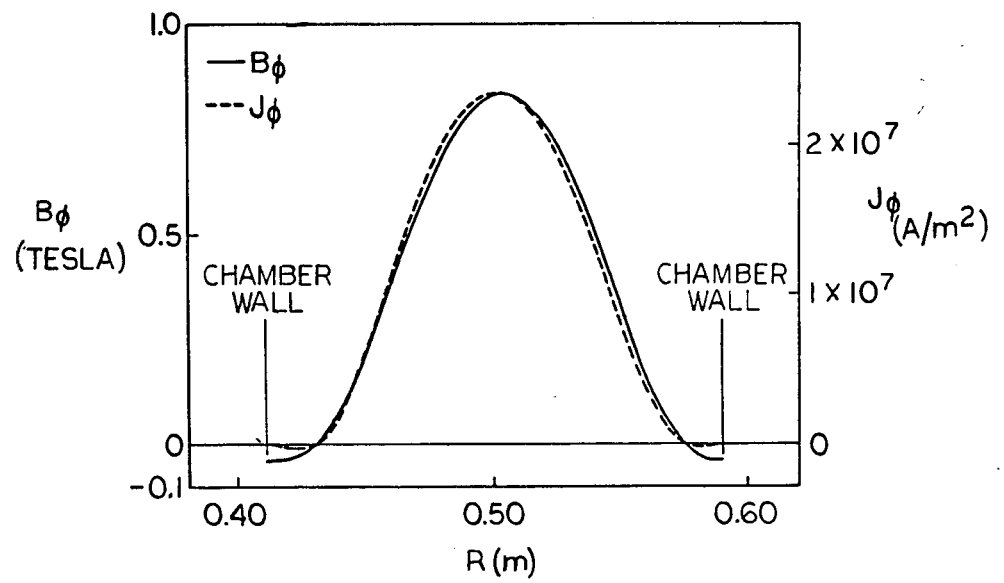
FIG. 5B

MULTIPLE PINCH METHOD AND APPARATUS FOR PRODUCING AVERAGE MAGNETIC WELL IN PLASMA CONFINEMENT

BACKGROUND OF THE INVENTION

This invention relates generally to plasma devices and particularly to the confinement and stabilization of plasmas in fusion devices by means of average magnetic well. More particularly, the present invention relates to the combination of multipole fields and the plasma pinch effect for the production of average magnetic well, most particularly in a toroidal system.

Toroidal plasma devices are devices in which plasma is created in a topologically toroidal space, usually axisymmetric, and is confined therein by appropriate confining magnetic fields. Toroidal plasma devices are useful in the generation, confinement, heating, study and analysis of plasmas. In particular, such devices are useful for the reaction of deuterium and tritium, deuterium and deuterium or other nuclear fusible mixtures, with the production of high energy neutrons and energetic charged particles as products of the nuclear fusion reactions.

The problems in nuclear fusion devices are largely to heat the plasma to a high enough temperature to enable the desired reactions to occur and to confine the heated plasma for a time long enough to release energy in excess of that required to heat the plasma to reaction temperature. The present invention is directed to the magnetic confinement of such plasma and finds particular utility in such devices and their applications, including experimental devices and the use thereof in experimentation and investigation with respect to toroidal plasma devices.

A number of toroidal plasma devices have been suggested and built. The ones most closely related to the present invention are: tokamak devices, including doublet devices; multipole devices; and z-pinch devices, including reversed field pinch (RFP) devices. In such devices, gas is confined in a toroidal confinement vessel and is heated to form a plasma which is generally held away from the walls of the confinement vessel by appropriate magnetic fields. Such devices are all topologically toroidal and are usually axisymmetric. A topological torus is any geometric solid figure that can be produced by an imagined elastic deformation of an initial circular torus. An axisymmetric torus is obtained by rotating any plane geometric figure about the major toroidal axis. An axisymmetric toroidal device is one in which all quantities are invariant to rotation about the major toroidal axis. A necessary condition for the toroidal magnetic confinement of plasmas is that the complete set of magnetic field components results in a set of nested, toroidally closed magnetic surfaces. A magnetic surface is defined as a mathematical surface on which the magnetic field has no component normal thereto. The magnetic surface enclosing zero volume in the center of the nest is called an elliptic magnetic axis. Most devices have only a single elliptic magnetic axis and a single set of nested surfaces. However, doublet devices have two elliptic magnetic axes, and multipole devices have two or more sets of nested surfaces.

In some toroidal devices, such as tokamak and pinch devices, the confining magnetic field includes magnetic field components produced by currents flowing through the confined plasma itself. When nested magnetic surfaces are present, this current is significantly concentrated into those magnetic surfaces closer to elliptic magnetic axes. Such regions of greater current density relative to the remainder of the plasma are called current channels.

In those toroidal devices where it is required, a toroidal plasma current is usually produced by a transformer with the toroidal confined plasma acting as the secondary and with the primary being a central solenoid. Upon change of the current in the solenoid, a toroidal electric field is produced to ionize the gas and drive plasma current around the torus.

A pinch effect takes place when electric current flowing through the plasma is acted upon by its own magnetic field to exert a confining pressure on the plasma. The large current simultaneously heats the plasma ohmically. However, this simplest configuration by itself, called the Bennett pinch, is unstable, and most of the plasma soon strikes the confinement vessel, hence cooling the plasma and impeding any reaction. For this reason, additional measures are taken to improve the stability of the system.

The magnetohydrodynamic (MHD) stability of a magnetically confined plasma is dependent on the pitch of the magnetic field lines encircling the magnetic axis or axes. This pitch P is defined by $$P = \lim_{k \to \infty} \frac{\Delta \zeta}{2\pi k} \quad (1)$$

where $\Delta \zeta$ is the distance traversed along the direction of the magnetic axis and k the number of times the axis is encircled, both while following a field line. This limit is the same for all possible field lines on a given magnetic surface. In toroidal plasma devices it is customary to use instead the safety factor q where $$q = P/<R>. \quad (2)$$

Here $<R>$ is the average major radius of the magnetic surface in question. For a general topological torus $<R> = <C>/2\pi$, where $<C>$ is the average major circumference of the nonaxisymmetric magnetic surface in question. There is a corresponding relationship between P and safety factor q for still more general systems. In order to be magnetohydrodynamically stable, toroidal plasma devices must satisfy certain necessary conditions on q. If r is the mean minor radius, then these conditions are:

(a) $|q| \neq 1$; and
(b)

$$s \equiv \frac{r}{q} \frac{dq}{dr}$$

must be large enough to satisfy relevant criteria, including the Mercier and the Robinson criteria; in particular, dq/dr must not change sign within the plasma, and it may be zero only at a magnetic axis. Conditions (a) and (b) taken together require that in plasmas with current channels, such as tokamaks and z-pinches, either $|q| \geq 1$ on axis and increases monotonically everywhere else in the plasma; or else $|q| < 1$ everywhere, decreases monotonically with increasing distance from the magnetic axis, passes smoothly through zero, and then increases monotonically with increasing distance from the magnetic axis in the outside regions of the plasma. The $|q| \geq 1$ case is realized in tokamaks, and the $|q|<1$ case in reversed field pinches. Condition (a) above is necessary to avoid a serious kink instability that arises when $q\approx 1$. In the case of substantially circular flux surfaces in axisymmetric tori, Eq. (2) can be written in the easily applied form $$q = \frac{r}{R} \frac{B_T}{B_P} \tag{3}$$

where $B_T$ is the toroidal and $B_p$ the poloidal magnetic field intensity. The quantity s appearing in condition (b) above is the magnetic shear, which exerts a stabilizing effect on many classes of instabilities, particularly on ideal MHD interchange instabilities and on many microinstabilities.

Another important property, which enhances stability by suppressing those MHD instabilities that are excited specifically by plasma pressure, is average magnetic well or minimum average B, where B is the magnetic field intensity. A review of the advantages of average magnetic well and of many configurations that have this property is given by H. P. Furth in *Advances in Plasma Physics*, Simon and Thompson, eds., 1 (Interscience Publishers, New York, 1968), pp. 67–100. The average square of the magnetic field intensity $<B^2>$ on a flux surface is calculated by $$<B^2> = \frac{\int B\, dl}{\int B^{-1} dl} \tag{4}$$

where the integration is taken by following a magnetic field line for a sufficient distance to sample all of the magnetic surface. The simplest definition of average magnetic well in the limit where the plasma pressure is small is a minimum of $<B^2>$ within the plasma. More generally, it has been shown by J. L. Johnson and J. M. Greene, Plasma Phys. 9 (1967), pp. 611–629, that magnetic well exists if $V^{}<0$, where $$V^{} = V'' - \frac{V'U''}{U'} - p'V'\left(\frac{V'}{U'} + \frac{L'}{V'}\right) \tag{5}$$

and $$V \equiv \int d\tau,\ U \equiv \int B^2 d\tau,\ L \equiv \int B^{-2} d\tau.$$

In the above equations, the integrations are over the volume enclosed by the flux surface, $d\tau$ is a differential volume, and V is the volume so enclosed. L, U, V and plasma pressure p are functions of flux, and the primes indicate differentiation with respect to flux. When $p'=0$, $V^{**}<0$ is the same as having a minimum of $<B^2>$ within the plasma. A magnetic well implies that the average of the magnitude of the magnetic field increases outwardly from the center of the device. Therefore, if the plasma is driven outward by an incipient instability, it encounters a stronger magnetic field which opposes its outward motion.

The most commonly used toroidal magnetic confinement configuration at present is the tokamak, whose principal defining characteristic is to satisfy the q stability requirements by operating with $|q|>1$ and $s\geq 0$ by supplying a sufficiently large toroidal magnetic field intensity $B_T$, in accordance with Eq. (3). Because the aspect ratio $A\equiv R/r$ is generally $\geq 3$, the toroidal field, which must be provided by a large toroidal field coil system disposed around the confinement vessel, must be large. Typically, $B_T = 5\ B_P$ to $10\ B_P$. Therefore, the maximum toroidal current $I_p$ flowing in the plasma, which is related to poloidal magnetic field intensity $B_P$ by the formula $B_P = \mu_0 I_p/2\pi r$, and with it the ohmic heating of the plasma, are limited by the maximum possible toroidal field intensity $B_T$ that can be withstood in a practical magnet system. A small magnetic well, which is also important for tokamak stability, is obtained by toroidal effects. The theoretically predicted maximum plasma pressure that can be confined is limited to $\beta \lesssim 0.10$ and may well be less, where $\beta \equiv <p>/(B^2/2\mu_0)$ is the ratio of the volume averaged plasma pressure to the magnetic pressure of the confining field. (Here and throughout the remainder of this disclosure the SI mks system of units is used.) Because of the small $\beta$ of the tokamak, fusion reactor concepts based on it either must be large or must employ extraordinarily high toroidal magnetic field strength.

Z-pinches are most readily distinguished form tokamaks, which they superficially resemble, by having $|q|<1$ everywhere throughout the plasma, and usually they have $|q|>>1$. The only toroidal z-pinch previously known to satisfy the necessary conditions on q is the reversed field pinch (RFP). A recent review of the RFP art has been given by H. A. B. Bodin and A. A. Newton, Nucl. Fusion 20 (1980), pp. 1255-1324. The RFP is a diffuse z-pinch in which the magnetic field component sensibly parallel to the magnetic axis has a direction in the outside region of the plasma opposite to that in the inner region, and as a result, q(r) passes through zero and changes sign within the plasma. In fact, greatly reduced instability is observed in z-pinch experiments when the reversed q(r) profile is established. The field and q reversal is achieved by trapping a toroidal field in a pinched plasma and providing external boundary conditions such that a toroidal field of the opposite sign can exist between the plasma and the wall. A conducting shell is also required for stability. The combination of toroidal current and reversed toroidal magnetic field achieved in RFPs produces an equilibrium state of very low free energy, which is stable at low $\beta$. This stability is independent of toroidal effects. Therefore, RFP aspect ratios can be chosen at will to optimize engineering and reactor parameters.

In the RFP the externally acting toroidal field is smaller than $B_P$. Therefore, unlike in the tokamak, $I_p$ is limited only by the maximum intensity of $B_P$ that can be withstood in the device, and large ohmic heating of the plasma is possible. Furthermore, the maximum $\beta$ achievable in RFP devices will probably be greater than in tokamaks. Therefore, fusion reactor concepts based on the RFP can either be smaller or use lower magnetic fields than with tokamaks.

Unfortunately, the RFP does not possess a magnetic well, and it has been predicted theoretically and observed in computer plasma simulations that an m=0 resistive interchange instability grows into a large convective cell near the q=0 surface and limits plasma confinement. Here m is the poloidal mode number of the instability in question. There are data suggesting that this instability is present in contemporary RFP experiments. Resistive interchange instabilities are among those that can be stabilized by magnetic well.

Multipole plasma confinement devices take a different approach to toroidal plasma confinement. In multipole devices, the toroidal plasma current is replaced by two or more solid conducting rings located internal to the plasma, which produce a set of nested closed magnetic surfaces around each ring. By convention the number of poles is equal to twice of the number of conductors. Thus, for example a device with two internal conductors is termed a quadrupole; four an octopole, etc. Since the current flows through rigid conductors, the current flow is stable. There is no necessity for a strong toroidal magnetic field. The current rings are placed so as to generate a multipolar magnetic field and at least one hyperbolic magnetic axis within the space roughly enclosed poloidally by the rings. Furthermore, these rings and the hyperbolic axis or axes are surrounded by an outer set of nested closed magnetic surfaces. The magnetic surface or surfaces passing through the hyperbolic axis and separating the outer magnetic surfaces from those magnetic surfaces that enclose only a single ring are called separatrix magnetic surfaces. Excellent confinement has been demonstrated in experimental multipole devices. Shear can be added by means of only a small toroidal field.

Multipole devices have a number of serious difficulties for high temperature plasma and fusion applications associated with the placement of conducting rings internal to the plasma. The rings require support structure, which intercepts charged particles, destroys the symmetry of the device, and leads to reduced confinement of plasma. Alternatively, the support structure can be eliminated by use of superconducting rings which are levitated by use of magnetic fields, but requirements to shield the superconductor from the high energy fusion neutrons are formidable.

SUMMARY OF THE INVENTION

The present invention involves a fundamentally different confinement principle, obtaining the best advantages of internal ring multipole and RFP devices in a multipole pinch device. The basic invention can be considered as a multipole device in which the solid internal rings have been replaced by high current z-pinch plasma current channels. Just as in the solid ring multipole devices, approximately equal currents flowing in parallel through the plasma current channels generate a hyperbolic magnetic axis and separatrix magnetic surfaces internal to the plasma. This produces an average magnetic well, provided the component of magnetic field in the direction of the hyperbolic axis is not too large in the vicinity of the hyperbolic axis, which can always be achieved by operating the plasma current channels like reversed field pinches so that $q=0$ occurs in the vicinity of said hyperbolic axis. Because z-pinch plasmas have a strong tendency to keep a nearly circular poloidal cross section, means are provided to prevent the multiple current channels from coalescing into a single, circular cross section RFP. Furthermore, the precise shape of the plasma can be adjusted and optimized, if necessary, by means of small currents in toroidal coils exterior to the conducting shell.

Stability in the multipole pinch invention is obtained by a q profile and conducting shell as in the RFP, plus the average magnetic well. In particular, when the $q=0$ surface coincides with the hyperbolic magnetic axis in the plasma, q varies monotonically outwardly from the elliptic axes. The magnetic well is then centered on the $q=0$ surface. This is the optimal theoretical location for the suppression of the $m=0$ resistive interchange instability that threatens to limit RFP $\beta$. In general terms, the average magnetic well increases the maximum $\beta$ that can be accommodated. The well in multipole pinch devices is independent of toroidal effects, and so the toroidal aspect ratio of such devices can be chosen at will. Like the RFP, the multipole pinch needs only small toroidal fields; thus, plasma current and ohmic heating are limited only by the maximum poloidal fields that can be withstood in the device.

The device of the present invention is distinctly different from prior art multipole devices in that the magnetic well is achieved without the use of solid rings immersed in the plasma and the problems that such rings entail. It is distinctly different from prior art RFP devices by provision of means to make plasmas with an average magnetic well by an internal hyperbolic magnetic axis. Furthermore, it is distinctly different from prior art helical pinches as in T. Ohkawa U.S. Pat. No. 4,302,284, sometimes referred to as OHTE, whose multiple hyperbolic axes are at the plasma surface rather than internal.

The device of the present invention is also distinctly different from the prior art doublet device, as in T. Ohkawa U.S. Pat. No. 3,692,626, which it superficially resembles. The doublet device is essentially a quadrupole in which the two solid internal conductors have been replaced by two tokamak current channels. The present invention, in its quadrupole form, replaces the two solid conductors by z-pinch current channels. The magnetic fields and currents within the two devices are very different. The most critical difference, from the viewpoint of the efficiency and construction of the device, is that the tokamak current channels of the doublet device require toroidal magnetic fields many times greater than the field produced by the plasma current, whereas in the z-pinch current channels, the fields are comparable. Furthermore, with a given toroidal field it is possible to drive a much larger current through the present device than through the doublet device, and the heating associated with this current drastically reduces the auxiliary heating requirements relative to the doublet device. The multipole pinch also differs from the doublet device in how the magnetic well is generated. Because of the large toroidal magnetic field, the average magnetic well in doublet devices arises from toroidal effects, as in the tokamak, and not because of a hyperbolic magnetic axis. In the low toroidal field environment of the multipole pinch device, average magnetic well is produced by its hyperbolic axis. The multipole pinch device is further differentiated from the doublet device by their different q profiles. The doublet q profile is everywhere greater than unity and passes through infinity at its internal separatrix magnetic surface; wheras in the multipole pinch device, q is much less than unity, is monotonically varying and passes through zero at its separatrix magnetic surface. Finally, the toroidal field in doublet devices varies only slightly throughout the plasma volume, whereas in multipole pinch devices it reverses direction between the elliptic magnetic axes and the boundary of the plasma. Therefore, a doublet device is built with a small aspect ratio A and with very strong toroidal field coils supplied with large currents; whereas a multipole pinch device is built with any convenient aspect ratio, usually $A \geq 5$, and with toroidal field coils designed for lesser magnetic fields and currents. Furthermore, a preferred multipole pinch device has an induction coil and associated power system designed to induce a toroidal electric field of at least 100 V/m during the plasma pinch formation phase of the discharge cycle; whereas a doublet device is usually designed to induce a weaker toridal electric field, such as less than 25 V/m in the Doublet III device at the General Atomic Company.

Thus, it is a primary object of the present invention to provide for magnetic pinch confinement of plasma with an average magnetic well obtained using at least one hyperbolic magnetic axis generated by multipolar magnetic fields produced by multiple z-pinch current channels. Other objects and advantages of the present invention will become evident from the consideration of the following detailed description, particularly when taken in conjunction with the accompanying drawings.

BRIEF DESCRIPTION OF THE DRAWINGS

FIGS. 5A and 5B show profiles of average magnetic field, q, and the toroidal components of magnetic field and current density, as computed from a specific toroidal MHD quadrupole equilibrium solution corresponding to the apparatus of FIGS. 2 and 3.

DETAILED DESCRIPTION OF THE INVENTION

Figure 1:
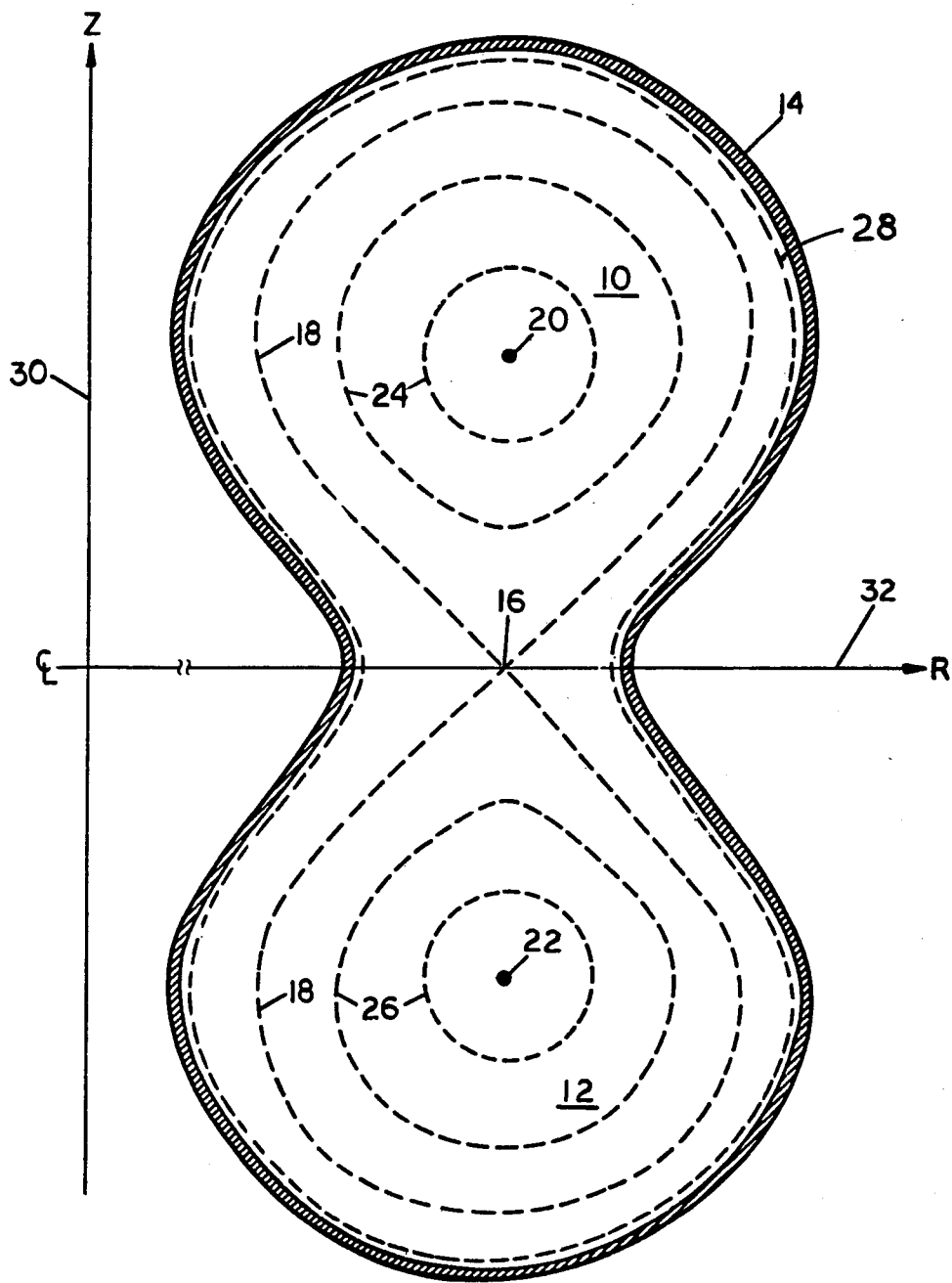
FIG. 1 illustrates the magnetic surfaces obtained, including the internal hyperbolic axis, when two z-pinch plasma loops are combined in accordance with a preferred form of the present invention.
Figure 2:
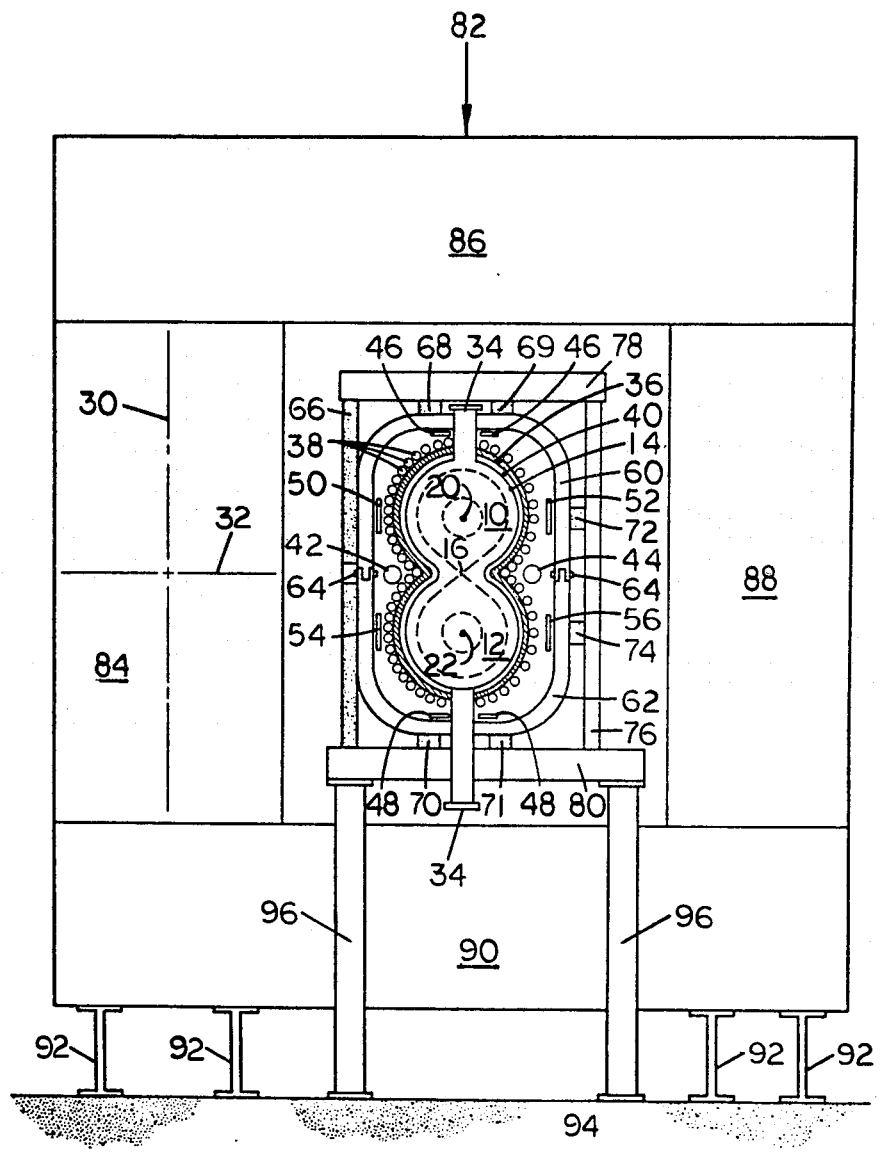
FIG. 2 is a poloidal sectional view of a preferred embodiment of the present invention for generating the magnetic surfaces shown in FIG. 1.
Figure 3:
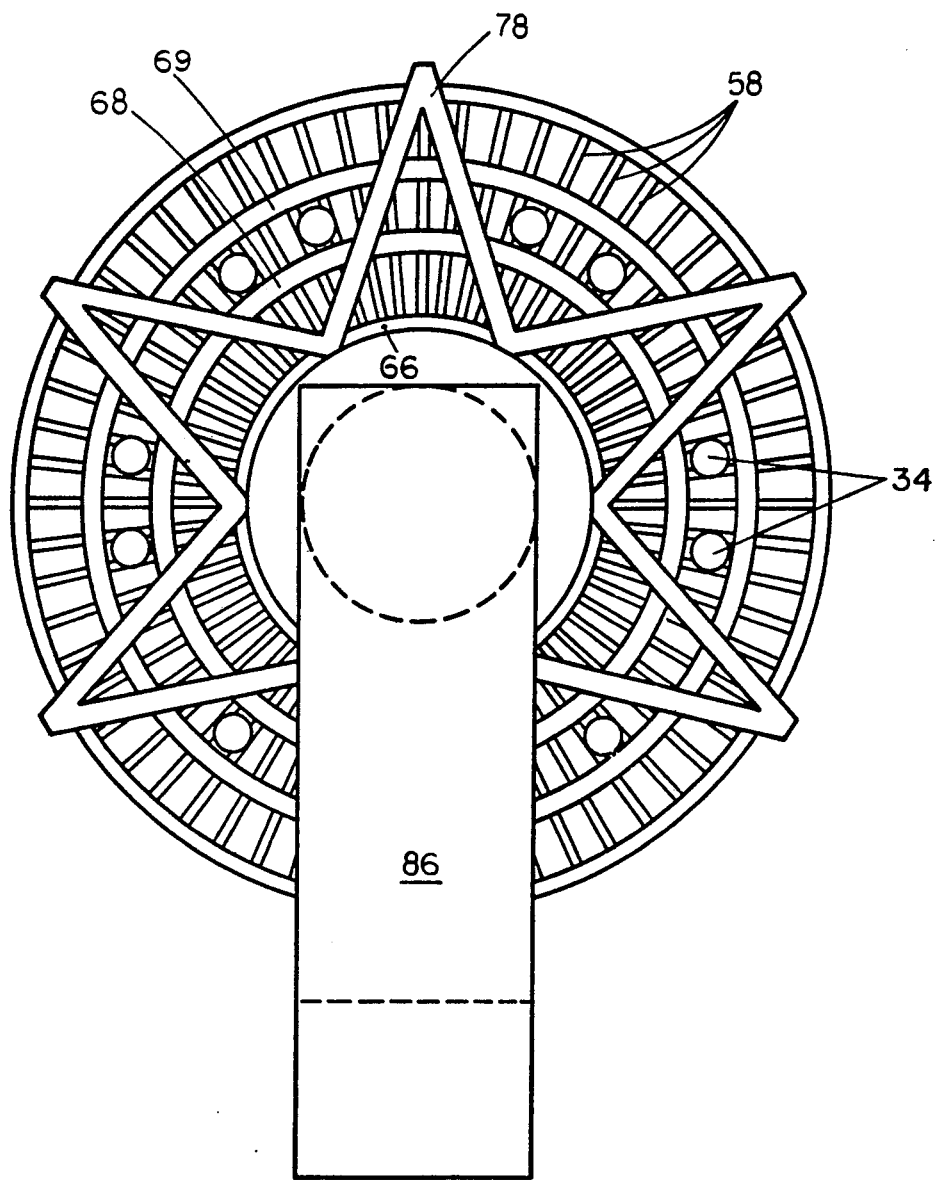
FIG. 3 is a plan view of the apparatus illustrated in FIG. 2.
Figure 4A:
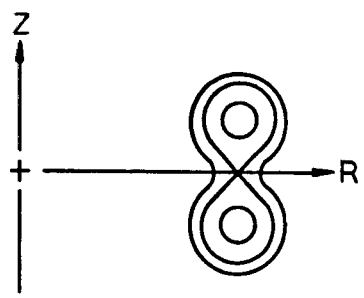
FIGS. 4A, 4B, 4C and 4D illustrate the two simplest arrangements of z-pinch plasma current channels for each of quadrupole and hexapole multipole pinch configurations.
Figure 4B:
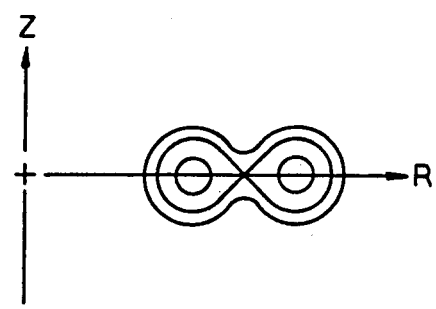
Figure 4C:
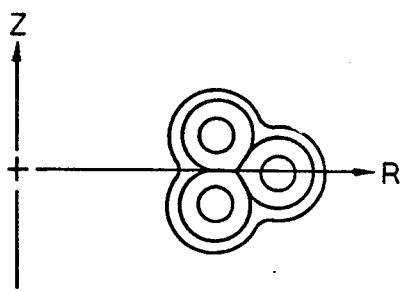
Figure 4D:
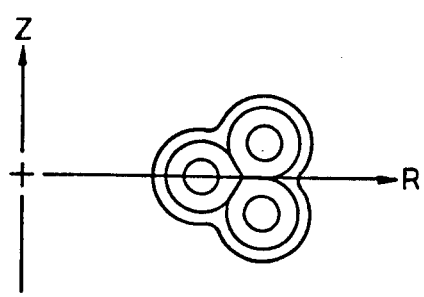

Central to the concept of the invention is the generation and control of two or more toroidal z-pinch plasma current channels within a common toroidal volume so as to produce an average magnetic well within the plasma utilizing an internal hyperbolic axis. The preferred embodiment described herein uses where possible techniques and apparatus that are common knowledge in the art of producing and applying hot, magnetically confined plasmas. A preferred embodiment of the invention for use as a plasma research device is illustrated in FIGS. 2 and 3, such device producing magnetic surfaces as illustrated in FIG. 1. As illustrated in FIGS. 1, 2 and 3, a plasma comprising two discrete z-pinch discharge channels 10 and 12 is created within a primary vacuum chamber formed by a wall 14 so as to form an internal hyperbolic magnetic axis 16, separatrix magnetic surfaces 18, and elliptic axes 20 and 22 with nested closed magnetic surfaces 24 and 26, respectively. A surrounding magnetic surface 28 is also illustrated in FIG. 1. Channels 10 and 12 and chamber wall 14 are symmetric with respect to the toroidal major axis 30 and midplane 32. The chamber wall 14 may be made of nonmagnetic stainless steel, such as 316 stainless steel, or of Inconel alloy, having a thickness of about 0.3 mm. The toroidal resistance of the chamber wall is greater than 5 m$\Omega$, which is sufficiently high to permit penetration of induced toroidal electric field in much less than 1 ms to ionize hydrogen or other gases injected into the chamber at a pressure of about 1 mTorr, and to drive toroidal plasma current. The inside of the wall 14 may be cleaned in situ by a combination of dc glow discharge cleaning and baking to a temperature of about 100° C., or by other effective techniques, to produce an atomically clean surface with a low outgassing rate.

Other materials having low electrical conductivity and compatible with high vacuum technique as practiced in fusion devices may also be used. As illustrated, the chamber is equipped with a plurality of ports 34 for various purposes, including viewing and making measurements of the plasma and evacuating the chamber to a pressure of $10^{-8}$ Torr. Standard turbomolecular or cryopump vacuum pumping systems, not illustrated, may be used for this purpose. The chamber wall 14 is shaped so as to closely approximate the desired shape of the plasma.

The major radius R of the plasma device illustrated is 0.50 m from the major axis 30 to the elliptic axes 20 and 22. The chamber defined by the wall 14 is 0.40 m high by 0.19 m wide at its widest point. Midplane width of the illustrated embodiment is 0.075 m, but the exact value of this dimension may be changed as desired or required for improved plasma performance with no change in the nature of the invention. Chamber cross sectional dimensions may be scaled to larger or smaller sizes, maintaining porportions close to those given here. The major radius of the chamber may be increased or decreased independently of cross sectional dimensions, because the plasma is insensitive to toroidal aspect ratio.

The characteristic boundary shape, whose purpose is to force the formation of the parallel current channels 10 and 12 and the hyperbolic magnetic axis 16, is imparted by a shaped shell 36 and distributed induction windings 38. Shaped conducting shells have been used for many years to impart particular shapes to plasmas, with the most similar prior art applications being in internal conductor multipole devices, as in Kerst and Ohkawa U.S. Pat. No. 3,194,739, and in doublet devices, as in Ohkawa U.S. Pat. No. 3,692,626. The exact shape of the shell 36 is determined by solution of the Grad-Shafranov equation for MHD equilibrium to be described in subsequent paragraphs, in order to yield a plasma with the properties sought. At the same time, the shell 36 aids in stabilizing the plasma by repelling, by the method of image currents, any plasma current that tries to move toward the wall 14. In a small plasma research device such as the one illustrated, clearance space 40 between the chamber wall 14 and the shell 36 is approximately 3 mm.

The shaped shell 36 is made of highly conducting metal, such as copper or aluminum, and it is 6 mm thick in the embodiment illustrated in FIGS. 2 and 3. The shell 36 includes an electrically non-conductive break to prohibit the flow of net toroidal current in the shell, which would otherwise act as a short-circuited secondary circuit for the induction winding 38. The break should be insulated to 10 kV to withstand transient voltages.

The chamber wall 14 alone is too thin to withstand atmospheric pressure without collapsing. Therefore, after the chamber has been aligned in its correct position within the shell, as for example by means of small electrically insulating spacers, clearance space 40 is filled with a liquid silicone mixture that can be cured in situ to an elastic, solid adhesive silicone rubber, bonding the two firmly together. Thus, it is shell 36, and not the thin chamber wall 14, that resists atmospheric pressure. Silicone rubbers are not available that easily withstand 100° C., the maximum bulk wall temperature during baking and cleaning. The maximum wall temperature rise expected when 100 kJ of energy is deposited uniformly on the wall during a test discharge is only 20° C.

The primary purpose of the induction coil 38 is to induce a toroidal electric field to ionize gas within chamber 14, thereby making plasma, and to drive sufficient toroidal current through said plasma to heat it resistively to high temperature. The poloidal magnetic field created by the z-pinch current also contributes the majority of the magnetic confinement of the hot plasma through the pinch effect, and therefore such current must be sustained for the desired duration of plasma confinement. The induction coil 38 is the primary winding of a transformer of which the plasma and, to a negligible extent, the chamber wall 14 form the secondary. This aspect of the device and the basic design considerations thereof are the same in the present invention as in RFP, tokamak and other ohmically heated toroidal plasma devices.

The induction coil 38 may also conveniently serve a second purpose, namely, to supplement the shell 36 in shaping the plasma. Because magnetic flux diffuses through a shell of thickness w, minor half width b and electrical conductivity ρ in a time τ shell given by $$\tau_{shell} = \mu_0 \rho w b / 2, \quad (6)$$

its power to control the shape of the plasma is lost after this time. For the device illustrated in FIGS. 2 and 3, $\tau_{shell}$ = 18 ms. However, plasma shape can also be accurately controlled by means of current distributed in external conductors, so as to provide magnetic boundary conditions identical to those of the shell. These conditions include also the so-called vertical field, which counteracts the tendency of the toroidal plasma to expand in major radius. Shaping by external coils has been demonstrated in both the Doublet II-A and Doublet III experiments. In FIG. 2, the individual turns of induction coil 38 are shown with a distribution that achieves the desired purpose. An infinitude of such distributions may be found, but the most efficient shaping is obtained when the windings are located close to the shaped shell 36, as illustrated. Satisfactory designs may also be obtained with a different number of turns than illustrated. Thus, the transition from plasma shaping by image currents in the shell 36 to shaping by the magnetic field produced by the special distribution of induction coil current conductors 38 is made smoothly, and the duration of the plasma is not limited by $\tau_{shell}$.

The induction coil 38 is energized in a conventional manner. For example, if the coil is split into upper and lower halves connected in parallel, a capacitor bank charged to 20 kV wll induce an electric field of 225 V/m in the toroidal direction. Such an electric field has been found to be more than adequate to establish hot plasmas in RFP experiments of similar size.

Shaping coils 42 through 56 are optionally included in the invention to provide a more flexible degree of control over the shape and position of the plasma. The principle is again similar to that used to shape plasmas in Doublet IIA and Doublet III experiments. Each trim coil is energized independently of the other windings, for example, by means of a thyristor chopper power supply. Coils 42 and 44 can vary the horizontal position of the hyperbolic axis 16. Coils 46 and 48, together with coils 42 and 44, can vary the vertical positions of the plasma current channels 10 and 12, respectively, in order to optimize the average magnetic well effect. Coil pairs 50 and 52, plus 54 and 56, control the radial positions of the plasma current channels 10 and 12, respectively, in the event that plasma expansion is not exactly counterbalanced during long lasting discharges by vertical field from the induction coil 38. The trim coils can be made to perform their functions in negative feedback loops by the addition of magnetic field pickups around the periphery of the plasma to sense its state and react through suitable amplifiers to control the thyristor choppers or other power supplies.

A plurality of toroidal field coils 58 are disposed about the plasma, chamber wall 14, shell 36, induction coils 38 and shaping coils 42 through 56, in order to produce the toroidal magnetic field required for stable pinch operation. The maximum toroidal field intensity to be supplied is about the same as for RFP plasmas, or less than ¾ of the poloidal magnetic field arising at the plasma surface 28 from plasma currents providing the pinch effect. If the embodiment illustrated in FIGS. 2 and 3 carries 300 kA of toroidal plasma current, then the toroidal field coils need supply only the modest field strength of 0.45 T or less. Thus, almost any conventional toroidal field coil design may be used. The preferred design facilitates disassembly for easy access to the induction coil, shell and chamber. The design illustrated employs copper conductors of rectangular cross section, 0.02 m by 0.04 m, formed into U-shaped pieces 60 and 62, and joined with bolted joints into a 60-turn coil uniformly encircling the toroidal components. Sixty turns is a sufficient number so that ripple in the toroidal field strength from the discreteness of the coil conductors is not a problem. The toroidal field coils 58 are aligned by cylinder 66 and rings 68 through 71, 72 and 74, which are electrically insulating and may be of fiber glass or other reinforced plastic composite. Vertical beams 76 and the cylinder 66, together with radial beams 78 and 80, clamp the toroidal field coils firmly in place. The cylinder 66 also reacts the radial compressive force exerted by the toroidal magnetic field on coils 58, while the rings 72 and 74 reinforce the toroidal field coils 58 against bending outward in the direction of the major radius. The rings 68 through 71 position and support the coils 58 in the vertical direction. The rings 68 through 71 are in turn supported by the radial beams 78 and 80 which are also preferably made of plastic composite. Stiffness against overturning moments in the toroidal field coils 58, which arise from the cross force between the vertical magnetic field component from the induction coil 38 and current in the toroidal field coils, is provided by the cylinder 66 and the diagonal arrangement of the radial beams 78 and 80, as seen in FIG. 3. The toroidal field coils 58 are energized by external means not shown, for example by a pulsed dc rectifier system or, in smaller research experiments, by a capacitor bank. A current of 15.6 kA through the copper conductor is sufficient to generate 0.45 T.

An iron core 82, consisting of a round central core 84 and a three-piece return yoke 86, 88 and 90 of rectangular cross section, is used to improve the transformer coupling between the induction coil 38 and the plasma secondary. The radius of the central core 84 illustrated is 0.2 m. When constructed of conventional, grain-oriented silicon transformer steel, the flux swing possible in the core is greater than 0.35 Wb, whereas extrapolation of RFP experimental data predicts that only about 0.2 Wb are necessary to form a 300 kA multipole pinch plasma of this size. The remaining 0.15 Wb of flux can be used to sustain the plasma current once established until the flux is consumed by plasma resistance.

The iron core 82 is supported by beams 82 on a solid platform or floor 94. The torus assembly, comprising the chamber wall 14, shell 36, induction coil 38, shaping coils 42 through 56, and toroidal field coils 58, is supported on columns 96. The central iron core 84 is concentric with the major axis 30 of the torus assembly.

The general behavior of z-pinch plasmas containing at least a small toroidal magnetic field was successfully explained by J. B. Taylor, Phys. Rev. Lett. 33 (1974), p. 1139–1141. Such a plasma contains magnetic helicity K, defined by $$K = \int \vec{A} \cdot \vec{B} \, dV \tag{7}$$

where $\vec{B}$ is the magnetic field, $\vec{A}$ is the magnetic vector potential defined such that $\nabla \times \vec{A} = \vec{B}$ and $\vec{A} = 0$ at the conducting shell, and the integration is over the enclosed toroidal volume. According to Taylor, a plasma can lose energy, through plasma instabilities, much more rapidly than magnetic helicity, even if the plasma has finite resistivity. Therefore, a plasma sheds its excess energy rapidly while virtually conserving its initial helicity, until the minimum energy state compatible with the fixed K and the geometry of the toroidal shell is attained. This is called a relaxed state, and it is stable to both ideal and resistive MHD instabilities because no more free energy is available unless K is changed. Taylor showed that the relaxed state obeys the condition $$\mu_o \vec{j} = \nabla \times \vec{B} = \mu \vec{B} \tag{8}$$

where j is the current density, $\mu_o$ is the magnetic permeability of vacuum and $\mu$ is a constant with dimensions of (length)$^{-1}$. Plasmas obeying Eq. (8) have no pressure gradient, because $Ep = \vec{j} \times \vec{B}$, and are therefore force free. The solutions to Eq. (8) are particularly simple for very large aspect ratio tori with a circular cross section. The lowest order mode is then $$B_\theta = B_o J_1(\mu r)$$

$$B_\phi = B_o J_o(\mu r) \tag{9}$$

where $J_o$ and $J_1$ are the Bessel functions, r is the minor radius measured from the minor axis of the torus, and $B_o$ is the field strength on this axis. Subscripts $\theta$ and $\phi$ refer to poloidal and toroidal directions respectively. When $|\mu r| > 2.405$, the first root of $J_o$, the toroidal field reverses.

Taylor's relaxation theory describes the principal features of circular cross section RFP plasmas as observed in experiments. In particular, plasmas tend to approach the configuration described by Eq. (9), independently of their initial state and the particular method used to produce them. Real plasmas differ slightly from the ideal Taylor states because of inevitable limitations, and therefore a low level of residual instability and turbulence is still observed in all recent pinch experiments. These limitations are principally:

1. Real plasma must have finite pressure; furthermore, substantially high pressures are desired for fusion applications.
2. $\vec{B}$, and therefore J in accordance with Eq. (8), are always large in Taylor states. Near the bounding shell, real plasmas are cold and hence have high resistance, and thus they are unable to carry the large current prescribed by Taylor states in this boundary region.

A principal object of the present invention, stated in the context of the preceding discussion, is to surround a central plasma, which can closely approximate a Taylor equilibrium, with a magnetic well. The additional stabilizing effect of the well acts to prevent, or at least to reduce, instabilities arising from the pressure of the plasma and from the low current boundary region. Since the magnetic field near the edge of a Taylor equilibrium is mainly poloidal, the well must be constructed with a poloidal magnetic field. The simplest example is the multipole pinch configuration, examples of which are given in the following.

Consider straight multipolar systems first for mathematical simplicity, where the longitudinal or s axis is analogous to the toroidal direction $\phi$, and r and $\theta$ preserve the same meanings as in toroidal geometry. The configurations are most conveniently expressed in terms of the poloidal flux function $\psi$, defined by $$\psi = \cdot \vec{i}_s \cdot (\vec{B} \times d\vec{l}) \tag{10}$$

$$\vec{B} = -\vec{i}_s \times E\psi \vec{i}_s B_s \tag{11}$$

The integration in Eq. (10) along any arbitrary, continuous trajectory, beginning on the flux surface where $\psi$ is defined to be zero, which may be arbitrarily chosen. Also, $d\vec{l}$ is a vector increment along such trajectory and $\vec{i}_s$ is the unit vector in the s-direction. Equation (8) can be rewritten in terms of $\psi$ as follows:

$$E^2 \psi + \mu^2 \psi = 0 \tag{12}$$

$$B_s = \mu \psi \tag{13}$$

The general nonsingular solution in cylindrical coordinates is given by $$\psi = \sum_{m=0}^{\infty} a_m J_m(\mu r) e^{im\theta}. \tag{14}$$

The solution consists of the sum of linearly independent modes, specified by integral poloidal mode numbers m, with amplitudes $a_m$; the $J_m$ are the Bessel functions of order m.

The simplest multipole plasma has the two lobe or quadrupole form. Consider $\psi$ given by $$\psi = a_o J_o(\mu r) + a_2 J_2(\mu r) \cos 2\theta + a_4 J_4(\mu r) \cos 4\theta \tag{15}$$

which yields flux surfaces like those shown in FIG. 1 when the m=2 term predominates. The m=0 term is the only term in Eq. (14) that produces axial field at the hyperbolic axis, where at r=0. Because the preferred configuration has zero axial field at the hyperbolic axis, as was explained previously, $a_o$ should be set equal to zero. The m=2 mode alone does not have closed magnetic surfaces encircling the plasma outside the separatrix surface. Adding a moderate amount of m=4 mode, for example making $a_4/a_2 > 0.7$ by external shaping means, is sufficient to produce such closed surfaces in a substantial volume and yields a configuration very similar to those shown in FIG. 1. Furthermore, the separatrix surface 18 in FIG. 1, and neighboring surfaces lie in a magnetic well. Thus, multipole pinch Taylor states with magnetic well exist. Basically, the internal conductors of a conventional multipole confinement system are replaced by Taylor equilibrium toroidal z-pinch plasma current channels, and the resultant is a multipole pinch Taylor state.

Higher order multipole solutions can be constructed in a similar manner. For example, hexapole pinch Taylor states with average magnetic well are obtained when $a_o=0$, the $m=3$ mode predominates, and a moderate $m=6$ amplitude, for example $a_6/a_3=0.4$, is added. The hexapole magnetic well is wider than its quadrupole counterpart, but the configuration, consisting of three z-pinch current channels, is more complicated. It is clear that still higher order multipole states with average magnetic well can be readily constructed mathematically. It is also obvious that the multipole plasma states can be oriented in any sense with respect to the major axis in a toroidal system. FIGS. 4A, 4B, 4C and 4D illustrate both quadrupole and hexapole plasmas, each in their two most symmetric orientations in toroidal geometry. Intermediate orientations are possible, but they add only complexity with no apparent increased benefit.

The most straightforward method to produce plasmas approximating a desired Taylor state is to:

1. Construct a conducting metal shaping shell whose shape is identical with the outermost magnetic surface of the desired state.
2. Prior to formation of the plasma, establish a toroidal magnetic field within the enclosed, evacuated toroidal volume by suitable toroidal field coil means. The strength of this field is chosen so that it provides a toroidal magnetic flux within the shell equal to the toroidal flux of the desired plasma state.
3. Inject the gas that will be ionized into plasma, using any conventional means. Optionally, the gas may be preionized.
4. Induce a toroidal electric field around the torus by an external induction coil. A large electric field, typically $>100$ V/m, is needed initially to ionize the gas completely and drive the toroidal current to the level of the desired state.
5. Once established, the desired state is sustained by decreasing the induced electric field to a value just adequate to maintain the toroidal current flowing through the electrical resistance of the plama, typically $\leqq 10$ V/m. Gas may be let into the chamber slowly to replenish gas absorbed by the metal walls, as is now customary in the plasma art.
6. The shape of the flux surface does not change radically as the mode amplitude ratio is changed. Therefore, a single shaping shell 36 can be used to study a continuum of neighboring equilbria by magneticaly trimming the boundary conditions by means of small currents through coils 42 through 56 external to said shell.
7. Because no transformer can induce an electromotive force indefinitely, the plasma discharge will eventually terminate. The duration of the discharge is increased as the possible flux change of the transformer is increased.

Axisymmetric toroidal plasma equilibria with finite plasma pressure and a general specified toroidal current density $j_{100} = j_\phi(\psi)$ may be calculated by solving the Grad-Shafranov equation:

$$V^2\psi = -\mu_0 R j_{100} \quad (16)$$

where
R = radial distance from the major axis 30
z = vertical distance from the midplane 32

$$V^2 = \frac{\partial^2}{\partial R^2} - \frac{1}{R}\frac{\partial}{\partial R} + \frac{\partial^2}{\partial z^2}.$$

Furthermore, $$B_R = \frac{1}{R}\frac{\partial \psi}{\partial z}, B_z = -\frac{1}{R}\frac{\partial \psi}{\partial R} \quad (17)$$

$$B_\phi = \frac{f(\psi)}{R} \quad (18)$$

$$j_\phi = \frac{B_\phi}{\mu_o}\frac{df}{d\psi} + R\frac{dp}{d\psi} \quad (19)$$

$$\vec{j}_P = \frac{\vec{B}_P}{\mu_o}\frac{df}{d\psi} \quad (20)$$

where $\vec{j}_P$ = poloidal current density.

The pressure and toroidal field functions $p(\psi)$ and $f(\psi)$ may be specified arbitrarily. However, not all such equilibrium solutions are stable. Taylor states obeying Eq. (8) are stable as pinches within a conducting shell. Toroidal Taylor states are obtained from Eqs. (16) through (20) when $dp/d\psi=0$ and $df/d\psi=\mu$, Taylor's parameter. Realistic deviations from the ideal Taylor state can be included as finite pressure and a $df/d\psi$ that is virtually constant in the interior plasma and becomes small or zero at the edge, thereby forcing $\vec{j}$ to do the same through Eqs. (19) and (20). The magnetic flux surfaces of FIG. 1 are drawn from a numerical solution of the Grad-Shafranov equation with zero presure, but with $df/d\psi=\mu_c(1<\bar{\psi}^n)$, $\bar{\psi}=(\psi_c-\psi)/(\psi_c-\psi_b)$, where $\psi_c$=central value of $\psi$ (at the elliptic axes), and $\psi_b$=boundary value of $\psi$. For FIG. 1 the aspect ratio $A=R_o/a$ is 5.4, $\mu_c=3.15/a$, $dp/d\psi=0$ and $n=4$. Here $R_0$ is the major radius of the elliptic axes and a is the half width of the plasma at its widest point. The exponent $n=4$ yields Taylor-like $\vec{j}/\vec{B}$ almost to field reversal, but the current is rapidly attenuated outside of reversal. Plots of q, $B_\phi$, $j_\phi$ and $<B^2>^{\frac{1}{2}}$ derived from this numerical solution are given in FIGS. 5A and 5B as a function of R through the elliptic axis 20 at height $z=0.102$ m for $R_o=0.5$ m and $I_\phi=300$ kA, which are the parameters for the apparatus shown in FIGS. 2 and 3. The toroidal field is slightly reversed, which yields the RFP-like reversed q profile. In the absence of plasma pressure, the local minima in $<B^2>$ seen in FIG. 5A are sufficient evidence of the average magnetic well. Thus, the desired magnetic well is still obtained in toroidal geometry and with a realistic plasma current distribution by means of the present invention, consisting of multiple Taylor z-pinch current channels generating a multipole-like magnet well.

The occurrence of average magnetic well in the multipole pinch can also be explained in simplified qualitative terms. The poloidal magnetic field is zero at the hyperbolic axis 16, because there the poloidal contributions from the two plasma current loops 10 and 12 are exactly equal and opposite. Similarly, the poloidal field is small in the vicinity of such hyperbolic axis, where the contributions from the two channels almost cancel. The separation between neighboring magnetic surfaces is greatly increased in the vicinity of the hyperbolic axis, which means that this vicinity is more heavily weighted during averaging of $B_P$ along a field line. Therefore, magnetic surfaces that come closest to the hyperbolic axis have a lesser average-poloidal field than nearby surfaces that do not approach it as closely. However, the toroidal field components must also be considered. It is a consequence of axisymmetry that the toroidal field-major radius product $B\phi R$ remains a constant on any givent magnetic surface. This condition is stated in Eq. (18). In the most common present art toroidal magnetic confinement systems, namely the tokamak and stellarator families, the toroidal field greatly excees the poloidal, and therefore average magnetic well can only be obtained by varying the relative average major radius positions $<R>$ of neighboring magnetic surfaces. In pinch devices, toroidal field strength is comparable to its poloidal counterpart, but not small enough to be negligible. Furthermore, it can have a large variation across flux surfaces. Therefore, the toroidal field should also reach a minimum value on or near the separatrix surface 18 in order to favor the formation of an average magnetic well.

For this reason, in addition to reasons cited earlier, it is advantageous to operate the present invention with the ratio of toroidal plasma current and magnetic field, or the parameter $\mu$ of the z-pinch current channels in terms of Taylor's theory, such that toroidal field reversal takes place at or near the separatrix surface. If exact coincidence of the field reversal and hyperbolic axis is not obtained, q will still pass through zero and change sign at the magnetic surface of field reversal, but q will reach infinity on the separatrix surface. The monotonicity of q(r) is interrupted in a narrow region near the separatrix surface in such a case. However, the infinite q and non-monotonic q(r) have produced no ill effects in doublet plasma devices, an therefore exact coincidence of field reversal with the separatrix surface is apparently not necessary for successful operation of the present invention. This anomaly in q is in such a small portion of the plasma that $|q|$ may still be considered less than 1 substantially everywhere in the plasma, as distinguished from tokamaks. The relative positions of reversal and well may be varied to obtain best plasma confinement as determined by experimental measurement.

In prior art RFP confinement a conducting shell close to the plasma has been considered a necessary requirement for plasma stability. The primary role of the shell is to resist by the image current effect the long wavelength link instabilities of the plasma, which can quench the hot plasma against the chamber wall of the apparatus. However, image currents decay exponentially at a characteristic rate approximately equal to $\tau_{shell}^{-1}$. It is therefore anticipated that RFP discharges lasting longer than about $\tau_{shell}$ may require a complex feedback system to prevent said kink instability. However, the external multipole field, particularly that portion generated by currents in induction coil conductors near the midplane 32 and/or in the shaping coils 42 and 44, resists displacements of the plasma current channels 10 and 12 in both z and R directions. Therefore, it may prove possible to eliminate conducting shell 36 under some conditions without suffering from plasma instability, gaining thereby greater design flexibility and simpler apparatus. In this case the shaping of the plasma into the multipole pinch configuration would be entirely by means of the external coils 38 and 42 through 56 or equivalents thereof.

The present invention therefore provides a method and apparatus for making magnetically confined toroidal plasmas of the reversed field pinch variety with a bounding average magnetic well. Average magnetic well is not possible in prior art RFP configurations. The present invention closely approximates an ideally stable Taylor pinch state. The location of the average magnetic well according to the present invention is such as to exert a stabilizing influence on instabilities driven by the pressure of the plasma, particularly the m =0 resistive interchange mode centered on the q=0 flux surface. The location of the average magnetic well is also favorable for the amelioration of effects arising out of the reduced plasma currents near the plasma boundary compared to the ideal stable Taylor state. Therefore, advantages of greater stability and/or greater $\beta$, generically termed improved plasma confinement, may be expected compared with prior art RFP devices.

While the novel aspects of a magnetic confinement plasma device in accordance with the present invention have been shown in a preferred embodiment, many modifications and variations may be made therein within the scope of the invention, as in the size, shape, and current and field intensities, as well as in application of alternate methods and techniques well known in the art of plasma and fusion. For example, the induction coil 38 may be designed to operate without an iron core 82. Furthermore, the conducting shell 36 may be constructed of separated upper and lower halves electrically insulated from each other at their midplane interface, which would allow operating the pinches in the well-known prior art aided reversal mode if desired. The device may also include various well-known appurtenances of plasma and fusion devices such as power supplies, vacuum pumps, instrumentation, blankets, heat exchangers, supporting structures and control systems. The particular embodiment described is designed for experimental and research purposes. Scaled-up embodiments intended for the production of a fusion and power will likely require these and other appurtenances.

What is claimed is:

1. A method for generating and containing plasma with a multipole plasma pinch comprising:
   generating plasma;
   passing current through the plasma in a plurality of discrete channels to form respective z-pinches therein which generate at least one hyperbolic magnetic axis within said plasma, each of said channels being disposed within the plasma and containing a respective set of nested closed magnetic surfaces defining a magnetic axis extending in the direction of current flow, said channels and said at least one hyperbolic axis being surrounded by an additional set of nested closed magnetic surfaces within the plasma; and
   forming an average magnetic well encompassing substantially all of said plasma while maintaining a safety factor q having an absolute value less than 1 substantially everywhere in the plasma.

2. The method according to claim 1 wherein said step of forming an average magnetic well includes making the component of magnetic field in the direction of said at least one hyperbolic axis substantially zero in the vicinity of such axis.

3. The method according to either one of claims 1 and 2 wherein said additional set of nested closed magnetic surfaces is bounded internally by a plurality of respective separatrix surfaces surrounding respective channels, said at least one hyperbolic axis lying on respective separatrix surfaces, and wherein said step of forming an average magnetic well includes making the component of magnetic field in the direction of said at least one hyperbolic axis reverse direction within said plasma outside said separatrix surfaces.

4. The method according to claim 3 wherein said well is formed substantially at a magnetic surface within said plasma where the safety factor q is substantially zero.

5. The method according to claim 4 wherein said channels are shaped and positioned by means external to the plasma.

6. The method according to claim 3 wherein said channels are shaped and positioned by means external to the plasma.

7. The method according to either one of claims 1 and 2 wherein said channels are shaped and positioned by means external to the plasma.

8. The method according to either one of claims 1 and 2 wherein said well is formed substantially at a magnetic surface within said plasma where the safety factor q is substantially zero.

9. The method according to claim 8 wherein said channels are shaped and positioned by means external to the plasma.

10. Apparatus for generating and containing plasma with a multipole plasma pinch comprising:
  means for generating plasma and maintaining a safety factor q having an absolute value less than 1 substantially everywhere in the plasma;
  means for passing current through the plasma in a plurality of discrete z-pinch channels to form respective z-pinches therein which generate at least one hyperbolic magnetic axis within said plasma, each of said channels being disposed within the plasma and containing a respective set of nested closed magnetic surfaces defining a magnetic axis extending in the direction of current flow, said channels and said at least one hyperbolic axis being surrounded by an additional set of nested closed magnetic surface within the plasma; and
  means for forming an average magnetic well encompassing substantially all of said plasma.

11. Apparatus according to claim 10 including wall means defining a chamber for containing said plasma, said wall means being spaced from said channels.

12. Apparatus according to claim 11 wherein said chamber and channels are toroidal.

13. Aparatus according to claim 12 wherein said chamber and channels are axisymmetric about the major axis of said chamber.

14. Apparatus according to any one of claims 10 to 13 including means external to the plasma for shaping and positioning said channels.

15. Apparatus according to claim 14 wherein said means for shaping and positioning includes an electrically conducting shell of the shape desired for said plasma.

16. Apparatus according to claim 14 wherein said means for shaping and positioning includes field shaping coils.

17. Apparatus according to any one of claims 10 to 13 wherein said means for passing current includes induction coils that are disposed external to the plasma for inducing said current and are distributed for shaping and positioning said channels.

18. Apparatus according to any one of claims 10 to 13 wherein said means for forming an average magnetic well includes means for making the component of magnetic field in the direction of said at least one hyperbolic axis substantially zero in the vicinity of such axis.

19. Apparatus according to claim 14 wherein said means fo forming an average magnetic well includes means for making the component of magnetic field in the direction of said at least one hyperbolic axis substantially zero in the vicinity of such axis.

20. Apparatus according to any one of claims 10 to 13 wherein said additional set of nested closed magnetic surfaces is bounded internally by a plurality of respective separatrix surfaces surrounding respective channels, said at least one hyperbolic axis lying on respective separatrix surfaces, said apparatus including means for making the component of magnetic field in the direction of said at least one hyperbolic axis reverse direction within said plasma outside said separatrix surfaces.

21. Apparatus according to claim 14 wherein said additional set of nested closed magnetic surfaces is bounded internally by a plurality of respective separatrix surfaces surrounding respective channels, said at least one hyperbolic axis lying on respective separatrix surfaces, said apparatus including means for making the component of magnetic field in the direction of said at least one hyperbolic axis reverse direction within said plasma outside said separatrix surfaces.

22. Apparatus according to claim 18 wherein said additional set of nested closed magnetic surfaces is bounded internally by a plurality of respective separatrix surfaces surrounding respective channels, said at least one hyperbolic axis lying on respective separatrix surfaces, said apparatus including means for making the component of magnetic field in the direction of said at least one hyperbolic axis reverse direction within said plasma outside said separatrix surfaces.

23. Apparatus according to claim 19 wherein said additional set of nested closed magnetic surfaces is bounded internally by a plurality of respective separatrix surfaces surrounding respective channels, said at least one hyperbolic axis lying on respective separatrix surfaces, said apparatus including means for making the component of magnetic field in the direction of said at least one hyperbolic axis reverse direction within said plasma outside said separatrix surfaces.

24. Apparatus according to any one of claims 10 to 13 wherein said means for forming an average magnetic well includes means for forming said well substantially at a magnetic surface within said plasma where the safety factor q is substantially zero.

25. Apparatus according to claim 14 wherein said means for forming an average magnetic well includes means for forming said well substantially at a magnetic surface within said plasma where the safety factor q is substantially zero.

26. Apparatus according to claim 18 wherein said means for forming an average magnetic well includes means for forming said well substantially at a magnetic surface within said plasma where the safety factor q is substantially zero.

27. Apparatus according to claim 20 wherein said means for forming an average magnetic well includes maans for forming said well substantially at a magnetic surface within said plasma where the safety factor q is substantially zero.

28. Apparatus according to claim 23 wherein said means for forming an average magnetic well includes means for forming said well substantially at a magnetic surface within said plasma where the safety factor q is substantially zero.

29. A multipole pinch plasma device comprising wall means forming a chamber; and means for generating plasma within said chamber and maintaining a safety factor q having an absolute value less than 1 substantially everywhere within said plasma and for producing an average magnetic well encompassing said plasma, including means for producing current in said plasma in a plurality of discrete z-pinch current channels to form respective z-pinches therein, each of said channels containing a set of nested closed magnetic surfaces defining a magnetic axis in the direction of current flow, said channels being spaced from said wall means and disposed within said plasma to form a hyperbolic magnetic axis therein, said hyperbolic magnetic axis and said current channels being surrounded by a set of nested closed magnetic surfaces.

* * * * *

UNITED STATES PATENT AND TRADEMARK OFFICE
CERTIFICATE OF CORRECTION

PATENT NO. : 4,543,231　　　　　　　　　　　　　　　Page 1 of 3
DATED : September 24, 1985
INVENTOR(S) : Tihiro Ohkawa It is certified that error appears in the above-identified patent and that said Letters Patent is hereby corrected as shown below:

In the Title Sheet:

Change "Multiple" to --Multipole--.

In the Specification:

Column 1, line 1, change "Multiple" to --Multipole--.

Column 4, line 18, change "form" to --from--.

Column 4, line 21, change "$|q|>>1$" to --$|q|<<1$--.

Column 9, line 21, change "$\rho$" to --$\sigma$--.

Column 9, line 22, change "$\rho$" to --$\sigma$--.

Column 9, line 49, change "wll" to --will--.

Column 10, line 24, after "joints" insert --64--.

Column 10, line 67, change "beams 82" to --beams 92--.

Column 11, line 29, change "j" to --$\vec{j}$--.

Column 11, line 32, change "Ep" to --$\nabla p$--.

Column 11, line 33, change "$\overset{\leftarrow}{to}$" to --to--.

Column 11, line 60, change "J" to --$\vec{j}$--.

UNITED STATES PATENT AND TRADEMARK OFFICE
CERTIFICATE OF CORRECTION

PATENT NO. : 4,543,231

DATED : September 24, 1985

INVENTOR(S) : Tihiro Ohkawa

It is certified that error appears in the above-identified patent and that said Letters Patent is hereby corrected as shown below:

Column 12, lines 17-18, change "Equation 10" to read
$$-- \psi = \int \vec{i}_s \cdot (\vec{B} \times \vec{d\ell}) --.$$

Column 12, line 19, change "Equation 11" to read
$$-- \vec{B} = - \vec{i}_s \times \nabla \psi + \vec{i}_s B_s --.$$

Column 12, line 21, after "(10)" insert --proceeds--.

Column 12, line 27, change "$E^2$" to --$\nabla^2$--.

Column 12, line 50, change "where" to --here--.

Column 12, line 56, change ">" to -- = --.

Column 13, line 61, change "$j_{100}$" to --$j_\phi$--.

Column 13, line 64, change "$j_{100}$" to --$j_\phi$--.

Column 14, line 19, change "$\vec{j}P$" to --$\vec{j}_p$--.

Column 14, line 34, change "<" to -- - --.

Column 17, line 40, change "surface" to --surfaces--.

UNITED STATES PATENT AND TRADEMARK OFFICE
CERTIFICATE OF CORRECTION

PATENT NO. : 4,543,231

DATED : September 24, 1985

INVENTOR(S) : Tihiro Ohkawa

It is certified that error appears in the above-identified patent and that said Letters Patent is hereby corrected as shown below:

Column 18, line 4, change "fo" to --for--.

Column 18, line 61, change "maans" to --means--.

Signed and Sealed this

Twenty-fifth Day of February 1986

[SEAL]

Attest:

DONALD J. QUIGG

Attesting Officer

Commissioner of Patents and Trademarks